May 26, 1970     L. B. SMITH ET AL     3,513,851
ELECTROTHERAPEUTIC PULSE GENERATING APPARATUS
Filed July 19, 1966     5 Sheets-Sheet 1

INVENTORS
LUTHER B. SMITH
FRANK A. YARGER

BY Cushman, Darby & Cushman
ATTORNEYS

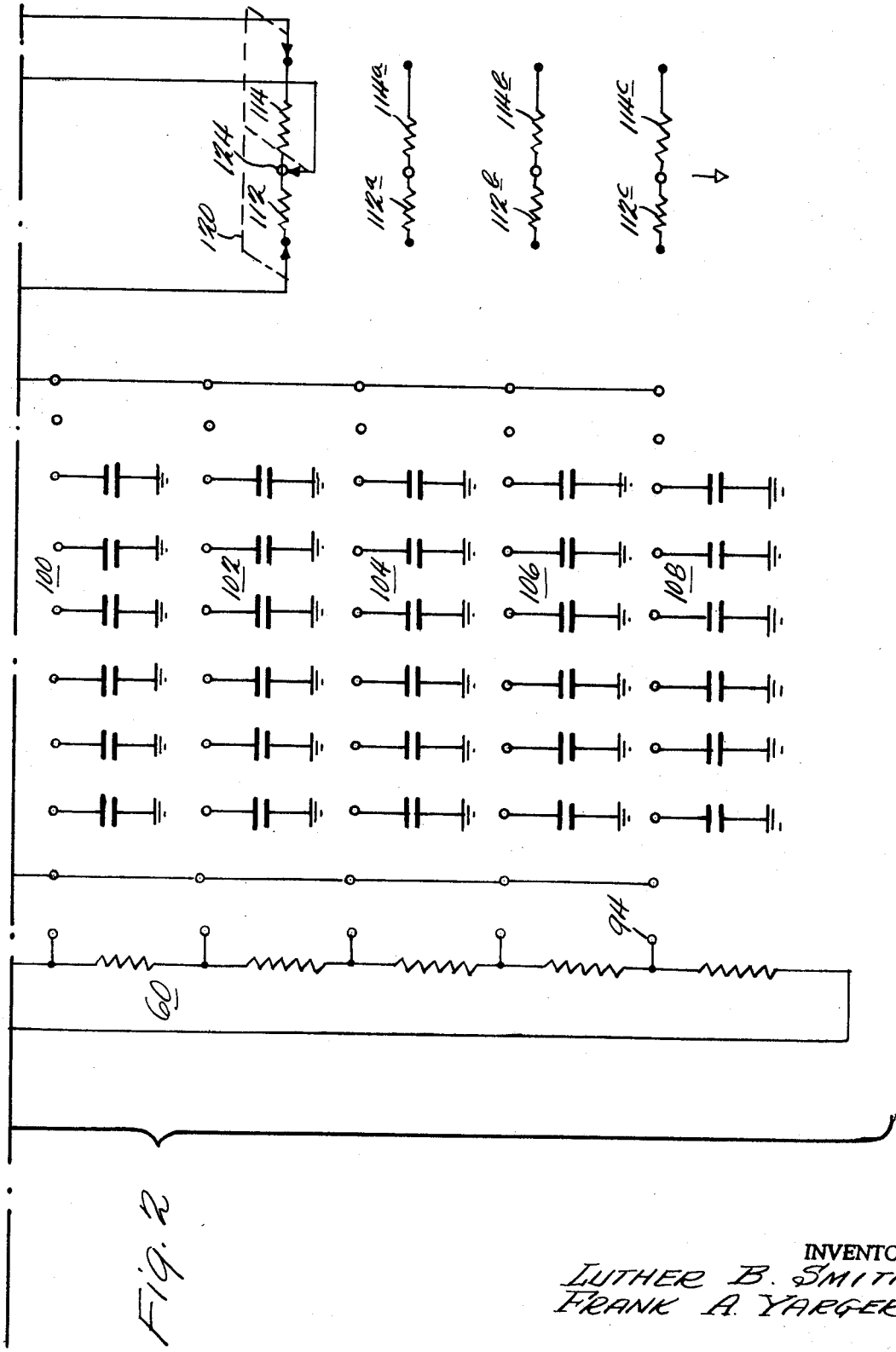

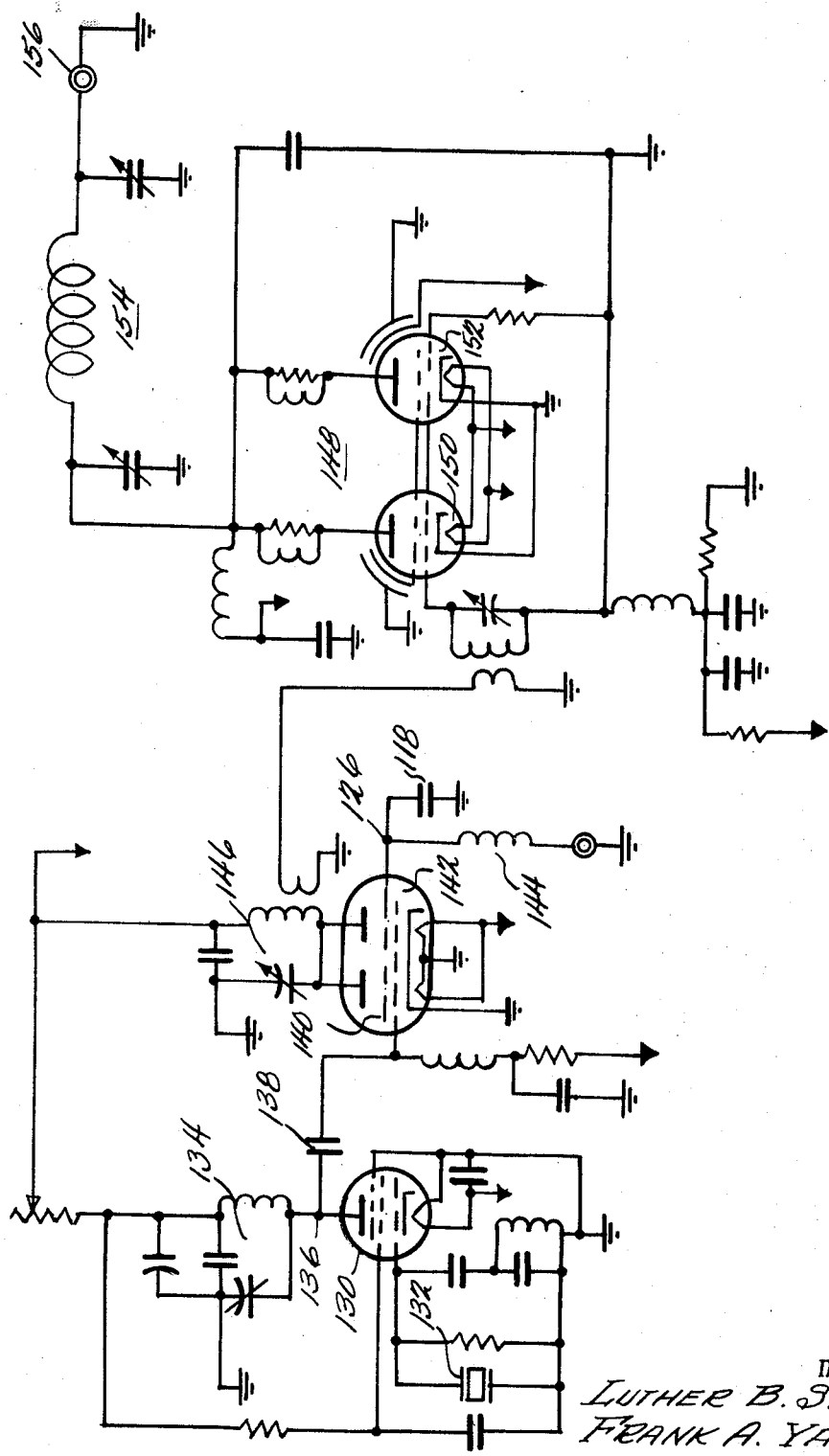

though this invention relates in general to apparatus for gen-

United States Patent Office 3,513,851
Patented May 26, 1970

3,513,851
ELECTROTHERAPEUTIC PULSE GENERATING APPARATUS
Luther B. Smith and Frank A. Yarger, Miami Beach, Fla.; said Yarger assignor to W. F. L. Try and R. E. Jordan, Camp Hill, Pa., and Vera R. Smith, Reno, Nev., executors of the estate of Luther B. Smith, deceased
Filed July 19, 1966, Ser. No. 566,346
Int. Cl. H05g 1/10; A61n 1/02
U.S. Cl. 128—422
15 Claims

ABSTRACT OF THE DISCLOSURE

Electrotherapeutic pulse generating apparatus is disclosed wherein pulses of radio frequency energy are applied to a patient. The pulses are developed by modulating a radio frequency signal with triangularly-shaped pulses. These pulses, in turn, are generated by integrating the leading and trailing edges of the output of a monostable multivibrator. The monostable multivibrator is triggered from either the leading or trailing edges of a free-running multivibrator.

---

This invention relates in general to apparatus for generating pulsed electromagnetic energy which is applied to an electrotherapeutic treatment head. In particular, this invention relates to improved pulse shapes of the pulsed electromagnetic energy which is applied to a treatment head.

It is intended that this invention be employed with electrotherapeutic treatment heads such as described in the copending application Ser. No. 600,341, Luther B. Smith, filed Nov. 17, 1966, which is a continuation-in-part of application Ser. No. 552,999, Luther B. Smith, filed Apr. 29, 1966 (now abandoned), which is a continuation-in-part of application Ser. No. 494,511, Luther B. Smith, filed Oct. 6, 1965 now abandoned; however, this invention may also be employed with other types of treatment heads. It is known that the efficacy of electro-therapeutic treatment of diseased areas of the body is improved by pulsing the electromagnetic energy. By so doing, the diseased area can be treated while at the same time eliminating overheating thereof.

Heretofore, rectangular-shaped pulses have been employed in electrotherapeutic apparatus. However, it has been found that modulating pulses having triangular shapes are desirable in electrotherapeutic applications.

Accordingly, it is a primary purpose of this invention to employ triangularly shaped modulating pulses in a pulsed, electrotherapeutic treatment device.

Further, it is another object of this invention to employ modulating signals having a wave form of isosceles triangular shape to modulate radio frequency power which is applied to the treatment head of an electrotherapeutic device, thereby resulting in a radio frequency pulse having a diamond shape.

Other objects and advantages of this invention will become apparent upon reading the appended claims in conjunction with the following detailed description and the attached drawings, in which:

FIGS. 2 and 3 show circuit diagrams of the block diagram shown in FIG. 1; and

Figure 1:
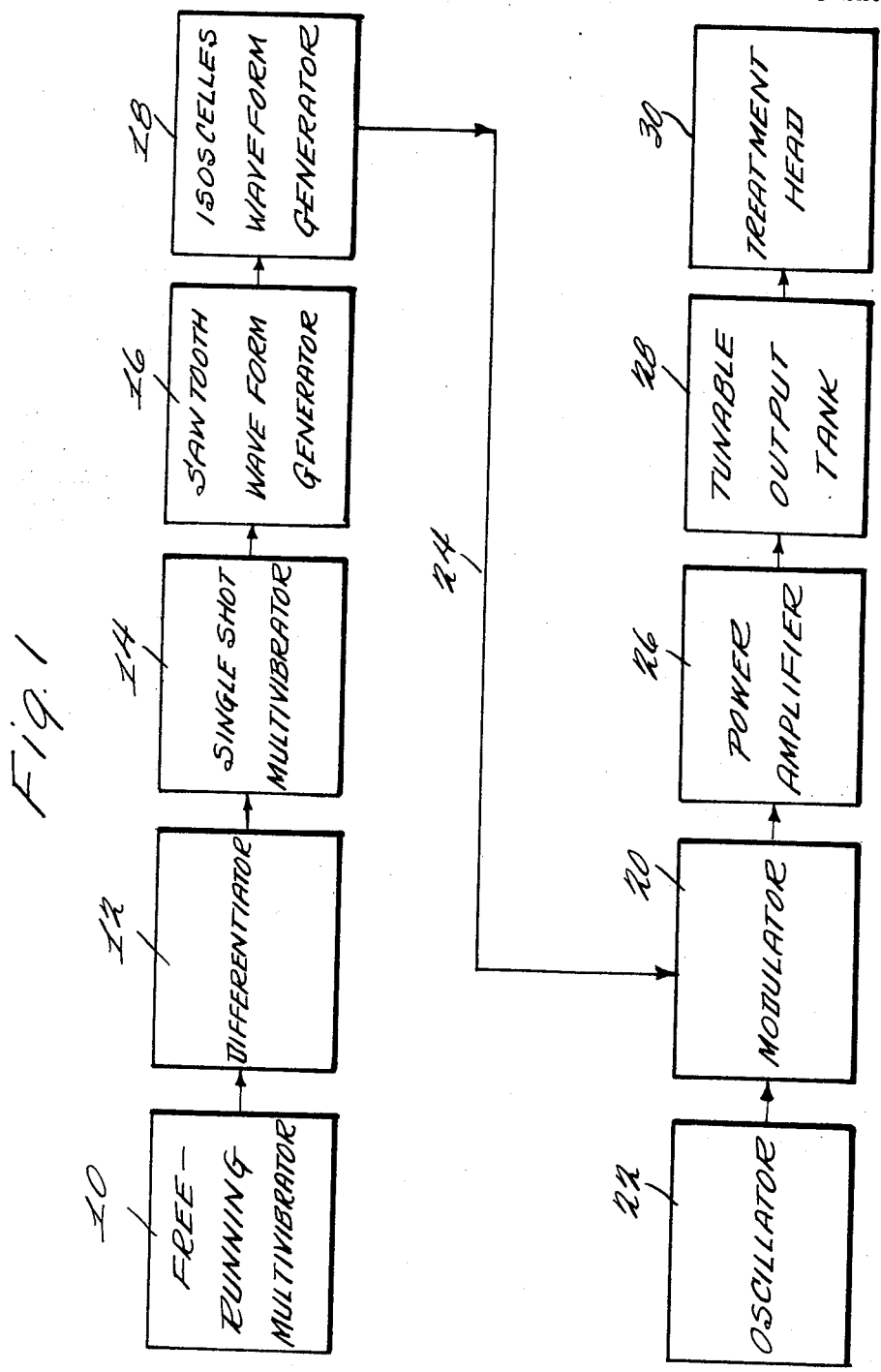
FIG. 1 shows a block diagram of an illustrative embodiment of the invention.
Figure 4A:
FIG. 4 shows wave forms of signals employed at various points in the illustrative embodiment of the invention.
Figure 4B:
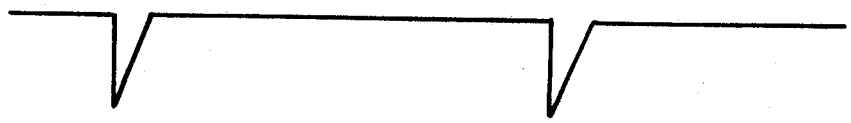
Figure 4C:
Figure 4D:
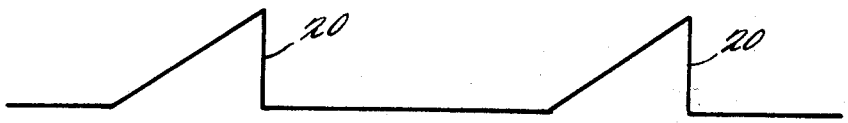
Figure 4E:
Figure 4F:
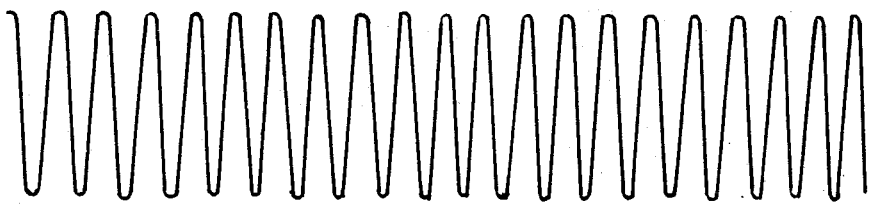
Figure 4G:
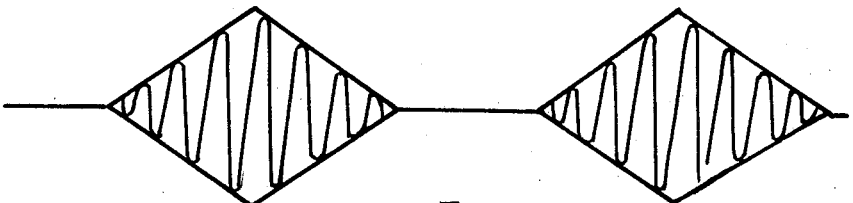

Refer to FIG. 1, which is a block diagram of an illustrative embodiment of the invention. A free running multivibrator generates a train of rectangularly shaped signals as shown in FIG. 4A. The pulse train is applied to differentiator 12 where actuating signals or triggers are generated as shown in FIG. 4B. These trigger pulse are applied to a single shot multivibrator which generates signals having waveforms of width W as shown in FIG. 4C in response to the trigger pulses. The rectangularly shaped signals at the output of single shot 14 are applied to sawtooth generator 16, the output of generator 16 being shown in FIG. 4D. The sawtooth signal is then applied to isosceles waveform generator 18 which operates on the trailing edge 20 (see FIG. 4D) of the sawtooth waveform producing a trailing edge 22 as shown in FIG. 4E. Thus, it can be seen that the waveform shown in FIG. 4E substantially approximates that of an isosceles triangle. However, as will be shown in more detail hereinafter, the slope of the trailing edge 22 may be adjustable and therefore waveforms other than that of an isosceles triangle are obtainable from generator 18. However, the isosceles shape is preferred. The isosceles shaped signal is applied to a modulator 20, which modulates the radio frequency output of oscillator 22 in accordance with isosceles shaped signal from generator 18 which is applied over line 24. The term "radio frequency" is employed in a general sense—that is, the frequency of the output signal from oscillator 22 is assumed to be substantially larger than the modulating signal frequency occurring at FIG. 4E. For instance, if a radio frequency output signal from oscillator 22 is as shown in FIG. 4F, then the output from modulator 20 appears as shown in FIG. 4G where each of the bursts of energy assumes a diamond shape as shown. These diamond shaped pulses of radio frequency energy are applied to power amplifier 26 and then to a tunable output tank 28. This tank provides final radio frequency tuning of the output signal applied to the treatment head 30. However, it is also possible to provide this final tuning at the head itself.

Figure 2:
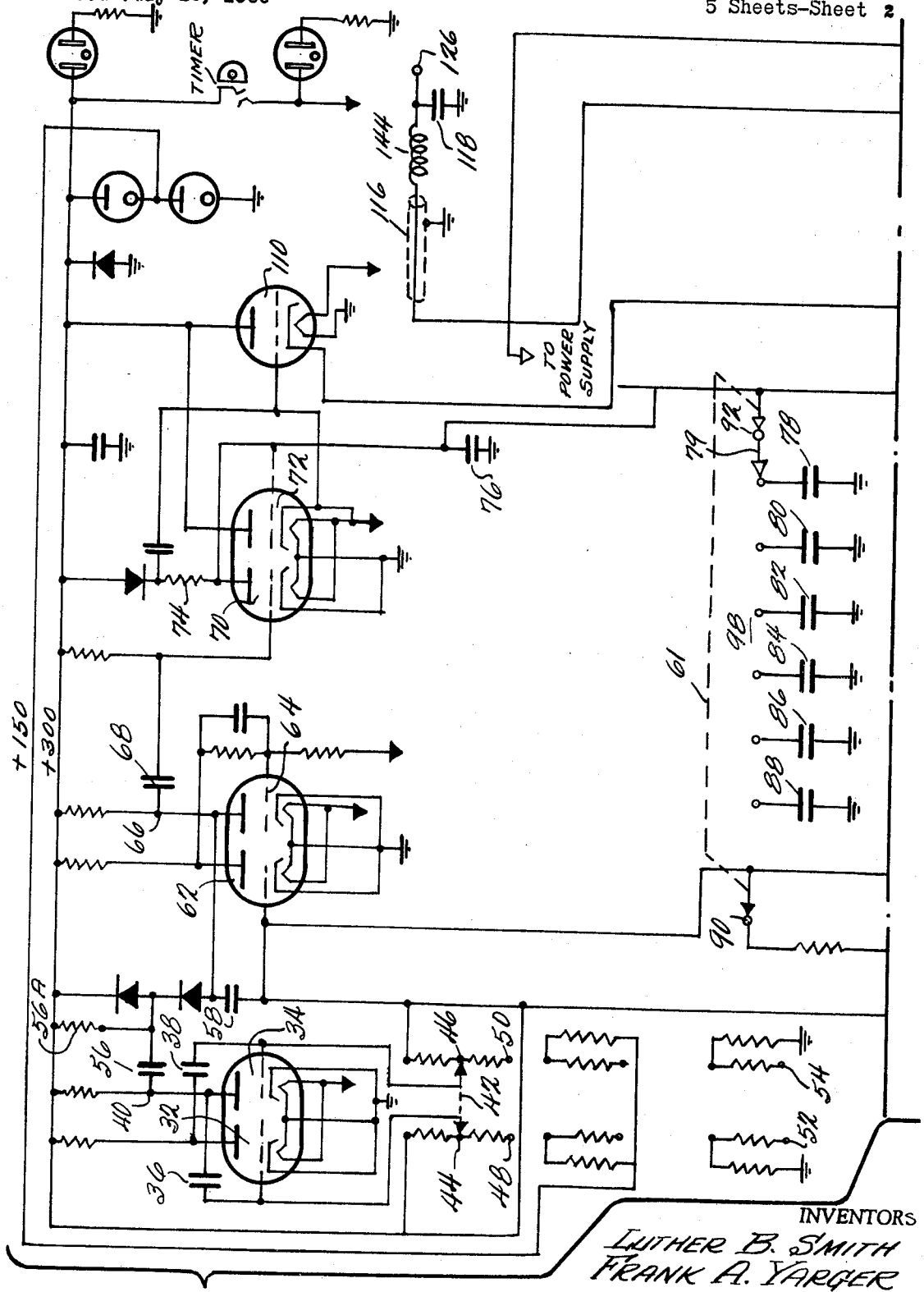

Reference should now be made to FIG. 2 which shows a circuit diagram of the elements 10 through 18 shown in FIG. 1. The multivibrator 10 of FIG. 1 employs tubes 32 and 34 in the conventional manner together with feedback capacitors 36 and 38. The pulse rate of the pulse sequence or train developed at terminal 40 is controllable by a 6-position switch 42. At the position shown, the pulse rate is 10,000 pulses per second. As the switch is moved downwardly to terminals 48 and 50, the pulse rate is decreased to 5000 pulses per second. At the lowest pair of terminals, 52 and 54, the pulse rate is 250 pulses per second. The pulse train at terminal 40 is applied through coupling capacitor 56 to a differentiating network comprising capacitor 56 and a variable resistor 56A. The output from the differentiator is applied to a single shot multivibrator as shown in FIG. 1 where the single shot circuit includes tubes 62 and 64, the remaining components of the single shot circuit being conventional.

Heretofore, in pulse generating apparatus employed with electrotherapeutic devices, the pulse rate and the pulse width have been controlled in a single multivibrator circuit. However, it has been observed that this dual control over the modulating signal cannot be accurately accomplished in a single circuit. Hence, pulse rate control is provided by the free running modulator 10 in accordance with the position of switch 42 as described above, while pulse width control is provided by adjusting the value of resistor 60 of the single shot multivibrator. This value is adjusted by the movement of 6-position switch 61, the operation of which will be described, in more detail after the operation of the sawtooth generator circuitry has been described in more detail for reasons that will become apparent. Thus the output signal from the single shot multivibrator 14 is a sequence or train of rectangular waveforms as is the output from free running multivibrator 10.

The output as shown in FIG. 4C from the single shot is taken from terminal 66 and applied through a coupling capacitor 68 to a boot strap sawtooth generator which includes tubes 70 and 72. The rise time of the sawtooth signal is controlled by resistor 74 together with capacitors 76 and 78 as shown in FIG. 2. Capacitor 78 is one of a bank 98 of capacitors 78 through 88. The purpose of this bank of capacitors is to control the peak amplitude that the sawtooth wave form rises to, this depending on the position position of 6-way switch. The width of the sawtooth waveform always remains the same as the width of the single shot output signal. As stated before, the width of the single shot output signal is controllable in accordance with the setting of switch 61. With the switch 61 in the position shown and being connected to terminals 90 and 92, the pulse width will be 50 microseconds. As the switch 61 is moved downwardly, the pulse width decreases. When switch 61 is across terminals 94 and 96, the pulse width is 25 microseconds. As the pulse width of the output signal appearing at terminal 66 of the single shot circuit decreases, the amplitude of the output signal of the sawtooth generator increases. However, to compensate for this increase in peak amplitude of the sawtooth signal, the settings along the resistor 60 correspond to different banks of capacitors 98 through 108. Thus, as the switch 61 is moved downwardly across resistor 60, thereby decreasing the pulse width and tending to increase peak amplitude of the sawtooth signal, a compensation is introduced by introducing a new bank of condensers which tend to maintain the peak amplitude of the sawtooth signal at a constant amplitude regardless of changes in the pulse width. Hense, greater control is maintained over the apparatus applying pulsed energy to a treated area thereby insuring that the patient will not be overheated due to an increase in pulse amplitude because of a corresponding change in pulse width.

The sawtooth signal is applied to a cathode follower circuit including tube 110 which has resistors 112 and 114 in the cathode circuit thereof as shown in the drawing. Due to the capacitance of the line 116 which connects to the modulator 20 (FIG. 1) and the capacitor 118 the modulation stage, together with the resistors 112 and 114, the trailing edge of the sawtooth wave form is integrated as shown in FIGS. 4D and 4E. The pair 115 of resistors 112 and 114 are one of a plurality of pairs. The remaining pairs 117, 119 and 121 are selectable by a 3-pole 5-position switch 120. As the switch is moved to the left, the slope of the trailing edge is decreased as shown at 122 by the dotted lines in FIG. 4E. This, of course, results in an increase of the pulse width. Thus, it can now be seen that a substantially pure isosceles waveform is obtainable when the slope of the trailing edge is made substantially equal to the negative of the slope of the leading edge. The isosceles waveform is preferred as the modulating signal which is applied to the modulator. Other deviations from the triangular waveform shown in FIG. 4E are also possible and may be desirable in some applications.

Thus, the modulating signal occurring at terminal 126 results from the integration with respect to time of both the leading and trailing edges of the sequence of rectangularly shaped pulses occurring at the output of the single shot multivibrator where the integration of the leading edge is performed by sawtooth generator 16 of FIG. 1 and the integration of the trailing edge is performed by the isosceles waveform generator 18 of FIG. 1. In some applications, it may be desirable to integrate only one of the edges of the rectangular waveforms, although generally it is preferable to integrate both the leading and trailing edges so that the slopes of these edges are equal to each other in magnitude but opposite in sign.

The terminal 124 must be maintained at a slightly negative voltage (preferably −4 volts) to prevent modulation of the radio frequency signal during off time of the modulating pulse. The portion 123 in FIG. 4E corresponds to the off time of the pulse. If the off time level assumes a positive value with respect to ground, it will result in overheating of the treated area. Preferably, this slightly negative voltage is maintained at terminal 124 by returning resistor 114 to a negative voltage at the power supply and causing the ratio of the values of resistors 114 and 112 to be approximately ten to one, where resistor 114 has the largest value. This same ratio also applies for resistors 112a–112c and 114a–114c.

Reference should now be made to FIG. 3. FIG. 3 shows an oscillator which includes tube 130, together with crystal 132. The output of the oscillator frequency is doubled in frequency at tank circuit 134 and applied to terminal 136. The signal is applied through coupling capacitor 138 to the modulator which includes tubes 140 and 142 operating in parallel. The screen electrode of each of these tubes is connected to the output terminal 126 shown in FIGS. 2 and 3 through a radio frequency choke 144. It has been observed that the screen modulation employed in this invention results in a modulated signal having desirable characteristics in an electrotherapeutic device. The modulated output signal is applied through frequency doubler tank 146 to power amplifier 148, which includes ceramic power amplifier tubes 150 and 152. The use of ceramic amplifier tubes has proven desirable in an electrotherapeutic apparatus because of the high resistance to overheating that these tubes display. These tubes are connected in parallel to provide the required amount of output power to the treatment head shown in FIG. 1. The output signal from the power amplifier 148 is applied to tunable tank circuit 154. The output from the tank circuit is then applied to terminal 156 which is connected to the treatment head by an appropriate connecting line which is not shown in FIG. 3, but which is diagrammatically indicated in FIG. 1.

Numerous modifications of the invention will become apparent to one of ordinary skill in the art upon reading the foregoing disclosure. During such a reading, it will be evident that this invention has provided a unique equipment for accomplishing the objects and advantages herein stated. Still other objects and advantages, and even further modifications will be apparent from this disclosure. It is to be understood, however, that the foregoing disclosure is to be considered exemplary and not limitative, the scope of the invention being defined by the following claims.

What is claimed is:

1. In apparatus for generating a pulsed, radio frequency electromagnetic signal which is applied to an electrotherapeutic treatment head, said pulse generating apparatus including means for generating a radio frequency signal; and means for modulating the radio frequency signal with modulating pulses having a predetermined shape to obtain said pulsed electromagnetic signal, the improvement comprising:
means for generating a sequence of signals having substantially rectangular waveforms; and
means responsive to said rectangularly shaped signals for integrating with respect to time at least one edge of each of said rectangular waveforms to obtain said modulating pulses.

2. Apparatus, as in claim 1, wherein said integrating means includes:
first means for integrating the leading edge of each of said rectangularly shaped signals; and
second means for integrating the trailing edge of each of said rectangularly shaped signals to obtain said modulating pulses.

3. Apparatus, as in claim 2, where said second integrating means includes means for adjusting the slope of said trailing edge.

4. Apparatus, as in claim 3, where said apparatus includes means for adjusting the peak amplitude of said modulating pulses.

5. Apparatus, as in claim 2, where said first integrating means causes the slope of said modulating pulse to have a predetermined value and where said second integrating means causes the trailing edge of said modulating pulse to have a slope equal in magnitude to said predetermined value but of algebraic sign opposite to that of said predetermined value.

6. Apparatus, as in claim 1, where said signal sequence generating means includes means for maintaining the peak amplitude of the modulating pulse at a substantially constant amplitude, regardless of changes in the pulse width of the said waveforms in said sequence.

7. An apparatus for generating a pulsed, radio frequency electromagnetic signal which is applied to an electrotherapeutic treatment head, said pulse generating apparatus including means for generating a radio frequency signal; and means for modulating the radio frequency signal with modulating pulses having a predetermined shape to obtain said pulsed electromagnetic signal, the improvement comprising:
  means for generating a sequence of signals having substantially rectangular waveforms;
  means responsive to said rectangularly shaped signals for integrating with respect to time at least one edge of each of said rectangular waveforms to obtain said modulating pulses;
  means for generating a first sequence of signals having substantially rectangular waveforms, said last-mentioned means including means for adjusting the rate of occurrence of said first sequence of signals;
  means for generating actuating pulses in response to the waveform transitions in said first sequence of rectangularly shaped signals; and
  means for generating said sequence of rectangularly shaped signals in response to said actuating pulses, said last-mentioned means including means for adjusting the width of said last-mentioned rectangularly shaped waveforms;
  precise control being obtained over the pulse width and rate of said sequence of rectangularly shaped signals because of the separate means employed for respectively controlling the pulse width and rate.

8. Apparatus as in claim 7 where said means for varying the rate of occurrence of said first sequence of signals is variable over the range of 250 to 10,000 signals per second.

9. Apparatus for generating pulsed, radio frequency electromagnetic signals which are applied to an electrotherapeutic treatment head, said apparatus comprising:
  means for generating a sequence of signals having substantially rectangular waveforms;
  means responsive to said rectangularly shaped signals for integrating at least one edge of each of said rectangular waveforms to obtain modulating pulses;
  means for generating a radio frequency signal; and
  means for modulating said radio frequency signal with said modulating pulses to obtain said pulsed, radio frequency electromagnetic signals.

10. Apparatus, as in claim 9, where said modulating means includes a vacuum tube having at least four electrodes, the modulating pulse being applied to the screen electrode.

11. Apparatus as in claim 10 including:
  power amplifier means responsive to said pulse modulated radio frequency signal for amplifying the power thereof and applying said signal to said electrotherapeutic treatment head, said power amplifier means including at least one ceramic power amplifier tube, thereby increasing the operating lifetime of said apparatus.

12. Apparatus, as in claim 9, where said integrating means includes
  first integrating means for integrating the leading edge of each of said rectangularly shaped signals; and
  second integrating means for intergrating the trailing edge of said rectangularly shaped signals.

13. Apparatus, as in claim 12 where said second integrating means includes means for adjusting the slope of said trailing edge.

14. Apparatus, as in claim 13, where said apparatus includes means for adjusting the peak amplitude of said modulating pulses.

15. Apparatus, as in calim 9, where said signal sequence generating means includes means for maintaining the peak amplitude of the modulating pulse at a substantially constant amplitude, regardless of changes in the pulse width of the said waveforms in said sequence.

References Cited

UNITED STATES PATENTS 2,823,311    2/1958    Bastir.
3,127,895    4/1964    Kendall et al. _____ 128—422

WILLIAM E. KAMM, Primary Examiner